United States Patent
Berk et al.

(10) Patent No.: US 9,710,358 B2
(45) Date of Patent: Jul. 18, 2017

(54) NATIVE BACKTRACING

(71) Applicant: Red Hat, Inc., Raleigh, NC (US)

(72) Inventors: Lukas Berk, Toronto (CA); Mark Wielaard, Deventer (NL); Frank Ch. Eigler, Brantford (CA)

(73) Assignee: Red Hat, Inc., Raleigh, NC (US)

( * ) Notice: Subject to any disclaimer, the term of this patent is extended or adjusted under 35 U.S.C. 154(b) by 29 days.

(21) Appl. No.: 14/293,460

(22) Filed: Jun. 2, 2014

(65) Prior Publication Data

US 2015/0347272 A1    Dec. 3, 2015

(51) Int. Cl.
G06F 9/44 (2006.01)
G06F 11/36 (2006.01)

(52) U.S. Cl.
CPC ...... G06F 11/3636 (2013.01); G06F 11/3644 (2013.01)

(58) Field of Classification Search
CPC ........... G06F 11/3644; G06F 2201/865; G06F 2201/815; G06F 9/45533; G06F 9/4553
See application file for complete search history.

(56) References Cited

U.S. PATENT DOCUMENTS

| | | | |
|---|---|---|---|
| 6,457,142 B1* | 9/2002 | Klemm et al. | 714/38.12 |
| 7,818,721 B2 | 10/2010 | Sundararajan et al. | |
| 7,822,844 B2* | 10/2010 | Oulu | G06F 11/3495 709/224 |
| 8,032,875 B2* | 10/2011 | Kosche et al. | 717/158 |
| 8,234,631 B2* | 7/2012 | Greifeneder et al. | 717/128 |
| 8,387,023 B2* | 2/2013 | Shagin | G06F 11/3612 717/130 |
| 8,645,761 B2 | 2/2014 | Barman et al. | |
| 8,701,088 B2* | 4/2014 | Wielaard | G06F 11/362 717/124 |
| 8,850,400 B2* | 9/2014 | Shrivastava et al. | 717/126 |
| 2003/0204838 A1* | 10/2003 | Caspole | G06F 11/362 717/130 |
| 2004/0054695 A1* | 3/2004 | Hind | G06F 11/3636 |
| 2004/0158589 A1* | 8/2004 | Liang | G06F 12/0253 |
| 2004/0215768 A1* | 10/2004 | Oulu | G06F 11/3495 709/224 |

(Continued)

OTHER PUBLICATIONS

Mary Jean Harrold et al.; Regression Test Selection for Java Software; 2001 ACM; pp. 312-326; <http://dl.acm.org/citation.cfm?id=504305>.*

Sudheendra Hangal et al.; Tracking Down Software Bugs Using Automatic Anomaly Detection; 2002 ACM; pp. 291-301; <http://dl.acm.org/citation.cfm?id=581377>.*

(Continued)

*Primary Examiner* — Thuy Dao
*Assistant Examiner* — Cuong V Luu
(74) *Attorney, Agent, or Firm* — Lowenstein Sandler LLP

(57) ABSTRACT

A system and method are disclosed for runtime probing of software. In accordance with one embodiment, a target method of a software application is modified to include a call to a first helper method and a call to a second helper method that occurs after the call to the first helper method. The first helper method collects runtime information, and at least one of the first helper method or the second helper method passes data comprising the runtime information to a native method that provides the data to a software tool (e.g., a performance monitoring tool, a debugger, etc.). The modified target method is then executed within a virtual machine.

19 Claims, 3 Drawing Sheets

(56) References Cited

U.S. PATENT DOCUMENTS

| | | | | |
|---|---|---|---|---|
| 2005/0198619 A1* | 9/2005 | Crisan | G06F 9/548 |
| | | | 717/114 |
| 2006/0129989 A1* | 6/2006 | Fleischer | G06F 9/4425 |
| | | | 717/124 |
| 2008/0127149 A1* | 5/2008 | Kosche et al. | 717/158 |
| 2009/0049429 A1* | 2/2009 | Greifeneder et al. | 717/128 |
| 2010/0100873 A1* | 4/2010 | Shagin | G06F 11/3624 |
| | | | 717/130 |
| 2010/0192128 A1* | 7/2010 | Schloegel et al. | 717/125 |
| 2011/0061042 A1 | 3/2011 | Deshmukh et al. | |
| 2011/0214108 A1 | 9/2011 | Grunberg et al. | |
| 2011/0296385 A1* | 12/2011 | Wielaard | G06F 11/362 |
| | | | 717/124 |
| 2012/0174076 A1 | 7/2012 | Rajic | |
| 2013/0205172 A1* | 8/2013 | Hudgons et al. | 714/38.1 |
| 2013/0318495 A1* | 11/2013 | Gardner | 717/111 |
| 2014/0089900 A1* | 3/2014 | Shrivastava et al. | 717/126 |
| 2014/0233056 A1* | 8/2014 | Onsen | H04N 1/00278 |
| | | | 358/1.15 |
| 2015/0135167 A1 | 5/2015 | Berk et al. | |

OTHER PUBLICATIONS

J. C. Huang; Program Instrumentation and Software Testing; 1978 IEEE; pp. 25-32; <http://ieeexplore.ieee.org/stamp/stamp.jsp?arnumber=1646909>.*

Christoph C. Michael et al.; Generating Software Test Data by Evolution; 2001 IEEE; pp. 1085-1110; <http://ieeexplore.ieee.org/stamp/stamp.jsp?arnumber=988709>.*

Leonardo Bottaci; Instrumenting programs with flag variables for test data search by genetic algorithm; 2002 Morgan Kaufman Pushblisher; 6 pages; <http://dl.acm.org/citation.cfm?id=2955737>.*

Philip M. Johnson; An Instrumented Approach to Improving Software Quality through Formal Technical Review ; 1994 IEEE; pp. 113-122; <http://dl.acm.org/citation.cfm?id=257751>.*

Wielaard, M., "Observing HotSpot with SystemTap", Free Java Devroom Fosdem, redhat, 2011, 29 pages, downloaded from http://sourceware.org/systemtap/wiki/HomePage?action=AttachFile&do=get&target=hotspot-stap.pdf on May 28, 2014.

Stone, J., "SystemTap Update & Overview", LFCS, redhat, 2011, 33 pages, downloaded from https://events.inuxfoundation.org/slides/2011/lfcs/lfcs2011_tracing_stone.pdf, retrieved May 28, 2014 on May 28, 2014.

* cited by examiner

NATIVE BACKTRACING

TECHNICAL FIELD

This disclosure relates to computer systems, and more particularly, to runtime probing of software.

BACKGROUND

A variety of tools are available for developing and debugging software applications, and monitoring and analyzing their execution.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
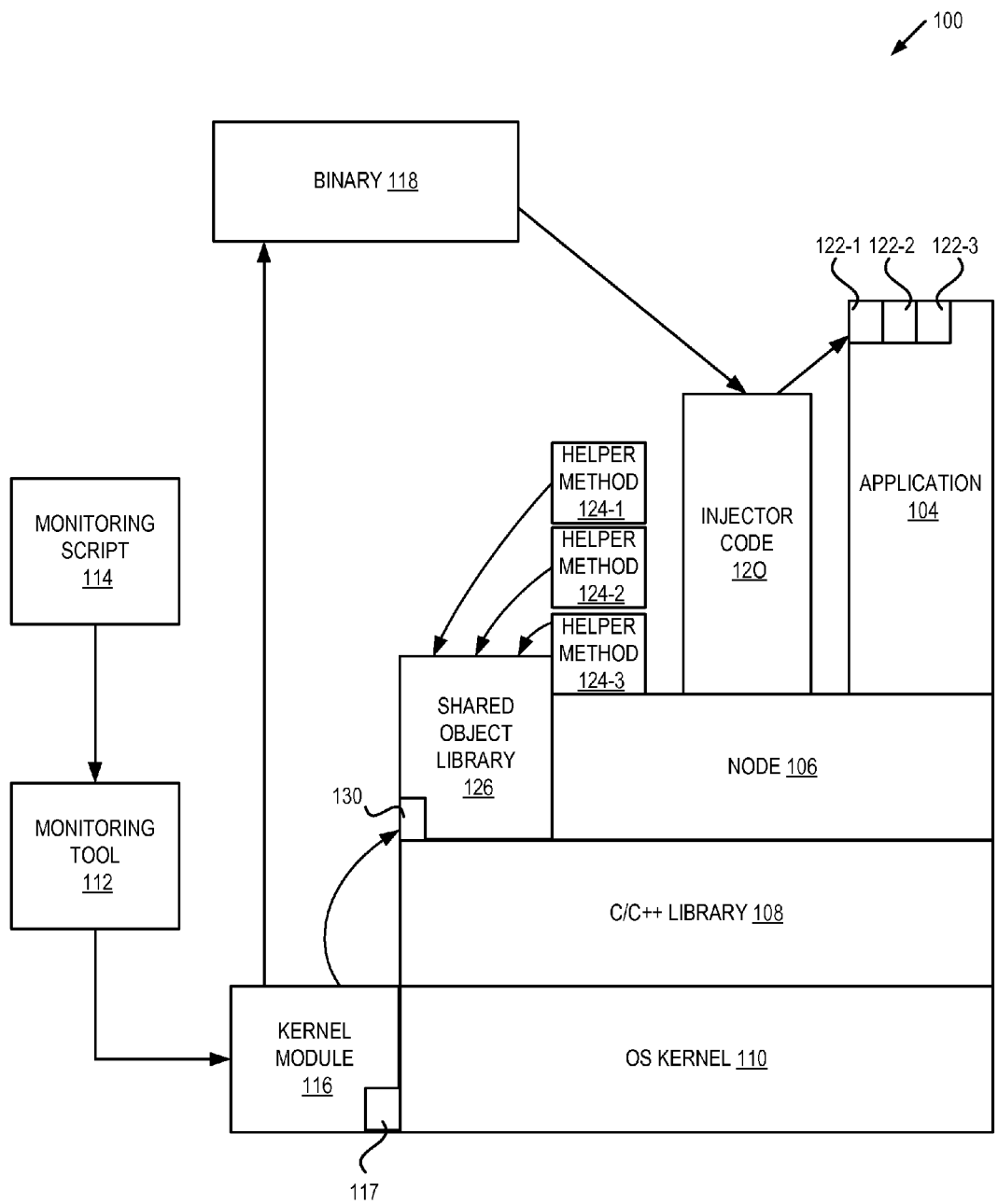
FIG. 1 depicts an illustrative computer system architecture, in accordance with an embodiment of the present disclosure.

Described herein is a system and method for runtime probing of software. In accordance with one embodiment, a target method of a software application is modified to include a call to a first, pre-processing helper method and a call to a second, main helper method that occurs after the call to the first helper method. The first helper method collects runtime information (e.g., stack traces, memory allocation information, etc.), and at least one of the first helper method or the second helper method passes data comprising this runtime information to a native method. The modified target method is then executed within a virtual machine, and the native method provides the data passed from the first helper method and/or second helper method to a software tool (e.g., a performance monitoring tool, a debugger, etc.), thereby enabling analysis of the target method by the software tool.

In one embodiment, the modification of the target method is performed by a script executed by a code injector, and the script for the code injector is generated by the software tool. In one example, the pre-processing helper method stores the runtime information in a data structure of the software tool, and the target method is further modified to include a call to a third, post-processing helper method that occurs after the call to the second helper method, and that removes this information from the data structure.

In one embodiment, the software application and its target method are in a first programming language, and the native method is in a second programming language. In one example, the software application and its target method are executed within a virtual machine, and the native method belongs to a shared library associated with the software tool and is not executed within a virtual machine. In one such example, the software application and target method are in the Java programming language, and the native method is in one of the C and C++ programming languages, and at least one of the helper methods comprise a foreign function interface known as the Java Native Interface (JNI).

In one embodiment, the native method includes a marker that is associated with a trio of probe points inserted in the application at respective locations relative to the target method. In one example, each of the three helper methods, when invoked, passes to the native method a rulename that identifies the marker. It should be noted that in the case of a software tool or script that ignores the provided runtime information, passing the rulename from the first and third helper methods as well as from the second, main helper method avoids the unnecessary expense of storing and deleting the runtime information.

In one embodiment, a software development tool (e.g., Systemtap) can be used to receive the runtime information concerning the execution of the target method. Such a software development tool can include a library of pre-defined probes and functions for an operating system kernel, and a scripting language for on-the-fly data reduction. The probes enable investigation of the operation of software without the need to recompile or restart the software. Such probing capabilities can also be used in user-space applications; for example, probes of the software development tool can be defined in a binary to enable threads to monitor the execution of the binary. In one example, an operating system kernel module associated with the software development tool serves as a conduit between the software development tool and the native method of the shared object library.

Embodiments of the present disclosure enable efficient runtime probing of programs in the Java programming language, while simultaneously providing runtime information such as stack traces, memory allocation information, and so forth for use in analyzing the program's execution. In contrast, systems of the prior art have either restricted runtime probing to the C/C++ runtime (because software tools such as Systemtap typically place probe points on an underlying library, virtual machine, or interpreter, rather than directly in a Java program), or they have allowed only limited runtime probing of Java programs, without any runtime information available to the software tools. Embodiments of the present disclosure therefore provide both the performance and data availability necessary for efficient and effective analysis of executing Java programs.

FIG. 1 depicts an illustrative architecture of elements of a computer system 100, in accordance with an embodiment of the present disclosure. The computer system 100 may be a server, a mainframe, a workstation, a personal computer (PC), a mobile phone, a palm-sized computing device, etc. It should be noted that other architectures for computer system 100 are possible, and that the implementation of a computer system utilizing embodiments of the disclosure are not necessarily limited to the specific architecture depicted by FIG. 1.

Computer system 100 comprises an application 104 that is written in a high-level programming language and a node 106 that serves as an environment in which application 104 executes. In one embodiment, application 104 is written in the Java programming language, and node 106 is a Java virtual machine (JVM) that is written in a programming language other than Java (e.g., C/C++, assembly language, etc.). In one example, node 106 is written in the C/C++ programming language and runs on top of a C/C++ library 108, which in turn runs on top of an operating system kernel 110. It should be noted that in some examples, node 106 may be written exclusively in C++, while some libraries and other utilities are written in C. It should be noted that in some other embodiments, application 104 may be written in a programming language other than Java (e.g., an object-oriented programming language other than Java, a programming language that is not object-oriented, a programming language other than Java that is interpreted, a programming language other than Java that is executed within a virtual machine, etc.).

In one embodiment, computer system 100 comprises a software tool 112 (e.g., a software development tool, a performance monitoring tool, a debugger, etc.) that is capable of receiving and executing a monitoring script 114 to collect information about an execution of application 104. In one embodiment, monitoring script 114 may specify a particular target method of application 104 to probe, a class name that includes the target method, a set of method parameters passed into the target method, if applicable, and one or more actions to execute when the target method is invoked. In one example, monitoring script 114 may also specify a unique identifier that may be a process identifier (ID) assigned to the application, a fully qualified class that uniquely identifies the class in which the target method is included, or a combination thereof. It should be noted that while monitoring script 114 is described with respect to a single target method to probe, in some other embodiments monitoring script 114 may specify a plurality of target methods and respective information for each target method (e.g., class name, parameters, actions, etc.).

In one example, application 104 may be dynamically probed on a per method basis. A user may select the target method of interest to probe in application 104 and specify the target method along with the parameter types for the probe point in monitoring script 114, where the parameter types may be of the set of method parameters passed into the target method.

In an example, probe point handler 117 may launch monitoring script 114. Software tool 112 may parse the desired probe point from monitoring script 114 and, based on this information, store particular probe points in kernel module 116 with the appropriate set of method parameters. In one example, probe points may also be stored in launch binary 118; the launch of binary 118 is described in detail below.

Software tool 112 may also determine a parameter count of the target method and create kernel module 116 in accordance with parsing monitoring script 114. In one example, software tool 112 may include the parameter count of the target method in kernel module 116.

In one example, the basic syntax for defining a Java probe point is Probe java ("PNAME").class("CLASS").method ("METHOD") {handler}, where PNAME is either a string of the Java program or a specific process ID of the Java program, CLASS is a fully qualified class name, and METHOD is the name of a target method, optionally with method parameter types.

Monitoring script 114 may instruct software tool 112 on what type of information to collect and what to do once that information is collected. An illustrative monitoring script 114 is shown below:

---
stap -e 'probe java("foo").class("Foo").method("bar(string, int, long)")
{printf("%s %d %d\n", user_string($arg1), $arg2, $arg3)}
---

In the above example, java("foo") indicates that foo is the process name, class("Foo") indicates that Foo is the class name, and method("bar(string, int, long)") indicates that bar is the method name with parameter types string, int, and long.

In one embodiment, software tool 112 processes monitoring script 114 by translating it to a native programming language, creating a kernel module in accordance with monitoring script 114, compiling the kernel module to determine compiled kernel module 116, and loading compiled kernel module 116 into kernel 110 of computer system 100. In one example, kernel module 116 includes a probe point handler 117 that executes one or more actions based on an event occurring (e.g., a target method being invoked, etc.) and may also invoke events that have subsequent actions outside of the handler (e.g., running a shell script, etc.).

In one embodiment, kernel module 116 identifies a target method to probe in application 104 in accordance with monitoring script 114, and detects when the target method is invoked during execution of application 104. In one example, monitoring script 114 specifies a process ID that uniquely identifies application 104, and the detection by kernel module 116 that the target method is invoked comprises detecting when an application with the specified process ID is executing.

In another example, monitoring script 114 specifies a fully qualified class name that uniquely identifies the class to which the target method belongs, and kernel module 116 detects when the target method is invoked by detecting when a class that matches the fully qualified class name has been instantiated. In yet another example, monitoring script 114 specifies both the process ID and the fully qualified class name.

In one embodiment, software tool 112 launches, via kernel module 116, a binary 118 capable of modifying application 104. Kernel module 116 may launch binary 118 when, for example, module 116 detects that the target method is invoked (e.g., when kernel module 116 detects that an application matching the process ID specified in monitoring script 114 is executing, when kernel module 116 detects that a class matching the fully qualified class name has been instantiated, etc.). Kernel module 116 may also launch binary 118 based on other events. For example, as is described in detail below with respect to FIG. 2, in one embodiment kernel module 116 detects that the target method has been invoked when a helper method with a matching rulename has been invoked. An illustrative binary 118 is shown below:

---
RULE <rulename>
CLASS <target fully qualified class>
METHOD <targeted method, including parameter type>
HELPER org.systemtap.byteman.helper.Helper1SDT
HELPER org.systemtap.byteman.helper.Helper2SDT
HELPER org.systemtap.byteman.helper.Helper3SDT
AT <ENTRY or RETURN or LINE XXX>
DO STAP_BACKTRACE(<rulename>)
DO METHOD_STAP_PROBEX(<rulename>, Xparameters)
DO HELPER_BT_DELETE(<rulename>)
ENDRULE
---

In one embodiment, binary 118 causes injector code 120 to perform the modification of the target method of application 104. The modification can be made without recompiling, repackaging, or redeploying application 104. In one example, the javac compiler may compile a file "foo.java" to "foo.class," which is included in application 104 and may be instantiated during the execution of application 104. In another example, if the target method has already been just-in-time compiled, the injector code 120 may handle the compilation and/or decompilation of application 104. For example, if application 104 is a Java application and node 106 is a JVM, to increase performance, the JVM may attempt to compile the Java byte code to the native architecture's machine language. If the code section of interest corresponding to a probe point has already been compiled to machine language, injector code 120 may still insert the helper methods and parameters.

In one embodiment, injector code 120 may modify application 104 by inserting three probe points 122-1, 122-2, and 122-3 in application 104 at locations relative to the target method being probed. In one example, injector code 120 may modify the target method by inserting probe points 122-1, 122-2, and 122-3 in the target method (e.g., at actual entry, exit, or particular line numbers of the target method) to include, respectively, a call to a first "pre-processing" helper method 124-1, a subsequent call to a second "main" helper method 124-2, and a subsequent call to a third "post-processing" helper method 124-3. The generation of injector code 120 and its operation are described in more detail below with respect to FIG. 2.

In one example, software tool 112 is Systemtap, monitoring script 114 is a Systemtap script, and the native programming language is C. In this example, Systemtap may obtain the Systemtap script and run the system C compiler to create kernel module 116. When kernel module 116 is loaded in the kernel of a computing device executing the script, Systemtap may monitor for events by hooking into the kernel and may launch the related handlers when the probe point is hit; then when the particular session has stopped, the hooks are disconnected and the module is removed. This entire process may be driven from a single command-line program stap.

In one example, binary 118 may be a Byteman script, and injector code 120 may be Byteman code. Byteman is a code injection tool that enables insertion of extra Java code into an application, either as it is loaded during Java Virtual Machine (JVM) startup, or after the application has already started running. The injected code may access the application data or call any application methods, including private data and methods. In one example, a Byteman script may call the Byteman code to inject code into application 104; this process is described in detail below.

In one embodiment, probe point handler 117 may include a first probe point handler for the first probe point 122-1 included in kernel module 116. In some examples the first probe point handler may invoke first helper method 124-1, while in some other examples the first probe point handler may launch binary 118 (e.g., a Byteman script, etc.) with the appropriate information passed as parameters that were gathered from software tool 112's invocation, while in yet other examples the first probe point handler may launch binary 118 to write, install, and submit a rule (e.g., a Byteman rule, etc.), while in still other examples the first probe point handler may perform some combination of these functions. In some embodiments kernel module 116 may detect when a Java process has begun, and the first probe point 122-1 may also be associated with instantiation of the target java program.

In accordance with one embodiment, probe point handler 117 may include a second probe point handler for the second probe point 122-2 inserted in kernel module 116. The second probe point handler may vary based on the handler initially specified by the user when invoking software tool 112. For example, in some embodiments the second probe point handler may invoke second helper method 124-2, while in some other embodiments the second probe point handler may include a determination of whether the known rulename for the target method matches the rulename passed by the marker, while in yet other embodiments the second probe point handler may perform both of these functions.

It should be noted that in the case of a single trio of Java probe points, it may be unnecessary to determine whether the rulenames match, while in the case of multiple Java probe point trios running concurrently (and possibly with the same number of parameters), this determination may be used to identify the appropriate marker associated with the rulename. It should be further noted that the second probe point 122-2 may target a related marker in shared object library 126 (e.g., libHelperSDT.so, etc.), and the rulename may allow for a small number of markers in shared object library 126 and enable the markers to be reused by multiple concurrent applications. In such an example, shared object library 126 may be written in the C (or C++) programming language, and helper method 124 may call a C (or C++) class.

In some examples, the rulename may be dynamically generated by software tool 112 and may be guaranteed to be unique. In such examples software tool 112 may provide a mechanism that provides conflict-resolution guarantees so that multiple script probes (including multiple instances of the same script) can run concurrently for the same node 106, the same application 104, and even the same target method.

In accordance with one embodiment, probe point handler 117 may include a third probe point handler for the third probe point 122-3 inserted in kernel module 116. In some examples the third probe point handler may invoke third helper method 124-3, while in some other examples the third probe point handler may uninstall the rule (e.g., Byteneame rule, etc.) via binary 118, while in yet other examples the third probe point handler may perform both of these functions. It should be noted that the third probe point 122-3 may target the end of the Java process, and that another probe point may target application 104 if the Java process ends with an error.

In one embodiment, helper method 124-1 may pass runtime information (e.g., a stack trace, etc.) to a native method of shared object library 126, helper method 124-2 passes a rulename and a set of method parameters passed into the target method to the native method, and helper method 124-3 is associated with removing the runtime information from a data structure of software tool 112 in which the runtime information is inserted. In one example, helper methods 124-1, 124-2 and 124-3 belong to respective Java classes comprising a Java Native Interface (JNI) foreign function interface and dynamically call the native method of shared object library 126, which is written in the C or C++ programming language. It should be noted that in some other embodiments, the application and helper methods may be written in a programming language other than Java, and the shared object library may be written in a programming language other than C/C++.

In one example, where Byteman is the code injector tool, a Byteman script may write the requested Byteman rule to determine whether the target program already has a Byteman agent installed (by port number tracking) and submit (and remove) rules. To use a Byteman rule, a Byteman agent is installed (or attached to the Java process) and the Byteman rule is submitted, which includes the actual modifications to the application to call the helper methods. If several rules are being attached to the same process, it may be unnecessary to install the Byteman agent more than once. In such instances, the port used to initially connect to the java process is tracked, and if the port is still open, any other rules may be submitted, resubmitted, or uninstalled. The same tracking may be used to determine the port to use when erasing or uninstalling the Byteman rule when the java process ends.

In one embodiment, kernel module 116 may detect each Java process invocation, thereby enabling a determination of whether the Java application matches the target application, and, when the applications match, launching binary 118 to install and submit a rule (e.g., a Byteman rule, etc.). It should be noted that in some examples, the determination of whether the Java application matches the target application may be performed by invoking another Java application (e.g., the JVM process status tool JPS, etc.), and this other application may re-trigger the first probe point 122-1 and re-check whether the detected running Java process matches the target process. It should further be noted that injector code 120 itself may be a Java program called by binary 118, and consequently both the installing of a rule and the installing of an agent may also trigger this check. For example, in one embodiment, injector code 120 may be run to install a rule immediately upon insertion of probe points into the kernel module, which requires that any Java process that is targeted must already be running when monitoring script 114 is invoked.

In one embodiment, the rulename passed to the native method by the second helper method 124-2 specifies a marker associated with the second probe point 122-2. In one example, the rulename may be unique on a system-wide level, or may be be unique within a script. In some examples, compile-time determination of the rulename may not be unique, in which case the determination of the rulename may be computable by monitoring application 112 at runtime. Additionally, the rulename may be passable to binary 118 (e.g., the script/stap portion that automatically creates the Byteman rule), back through the .btm file, and back through the sdt.h parameters. In one embodiment, the rulename is a property of the kernel module name concatenated with the probe point number of the probe point, and may be of the form module_name( ).probe_NNNN, where module_name( ) returns the name of the stap module that is either generated randomly (e.g., stap_[0-9a-f]+_[0-9a-f]+, etc.) or is set by a command (e.g., stap-m<module_name>, etc.). Similarly, the probe point number may either be generated randomly or set by a stap command. It should be noted that in one example, duplicate module names are prohibited from being inserted into the kernel to ensure that all rulenames are unique.

As mentioned above, the native method in shared object library 126 may include a marker 130 that is associated with the second probe point 122-2. Marker 130 may be placed in code that provides a hook to call a function that is provided at runtime, and kernel module 116 may hook into marker 130 in the shared object library 126. The provided function may be called each time marker 130 is executed, in the execution context of the caller. When the function provided ends its execution, execution flow may return to the caller (continuing from the marker site). In one example, execution of the application may resume from the target method and injector code 120 may modify the target method to include a call to second helper method 124-2 that enables software tool 112 to inspect probe point 122-2 and marker 130 using shared object library 126.

In one example, marker 130 is a Systemtap SDT marker that is compiled into binary code that is placed in shared object library 126. When marker 130 is in use, it may pass one or more parameters to kernel module 116 for inspection, while when marker 130 is not in use, the binary code may simply be a no operation instruction (e.g., a "NOP", etc.). An illustrative marker definition is shown below:

STAP_PROBE10(Helper2SDT, method_9, arg1, arg2, arg3, arg4, arg5, arg6, arg7, arg8, arg9, rulename)

In this example, STAP_PROBE10 is the name of marker 130 in shared object library 126, arguments arg1 through arg9 are either arguments of marker 130 or the arguments being passed from the target method, and Helper2SDT is the name of the second helper method 124-2 that passes the rulename and parameters to shared object library 126. It should be noted that the name STAP_PROBE10 indicates that there are ten arguments to be interpreted by monitoring script 114.

Figure 2:
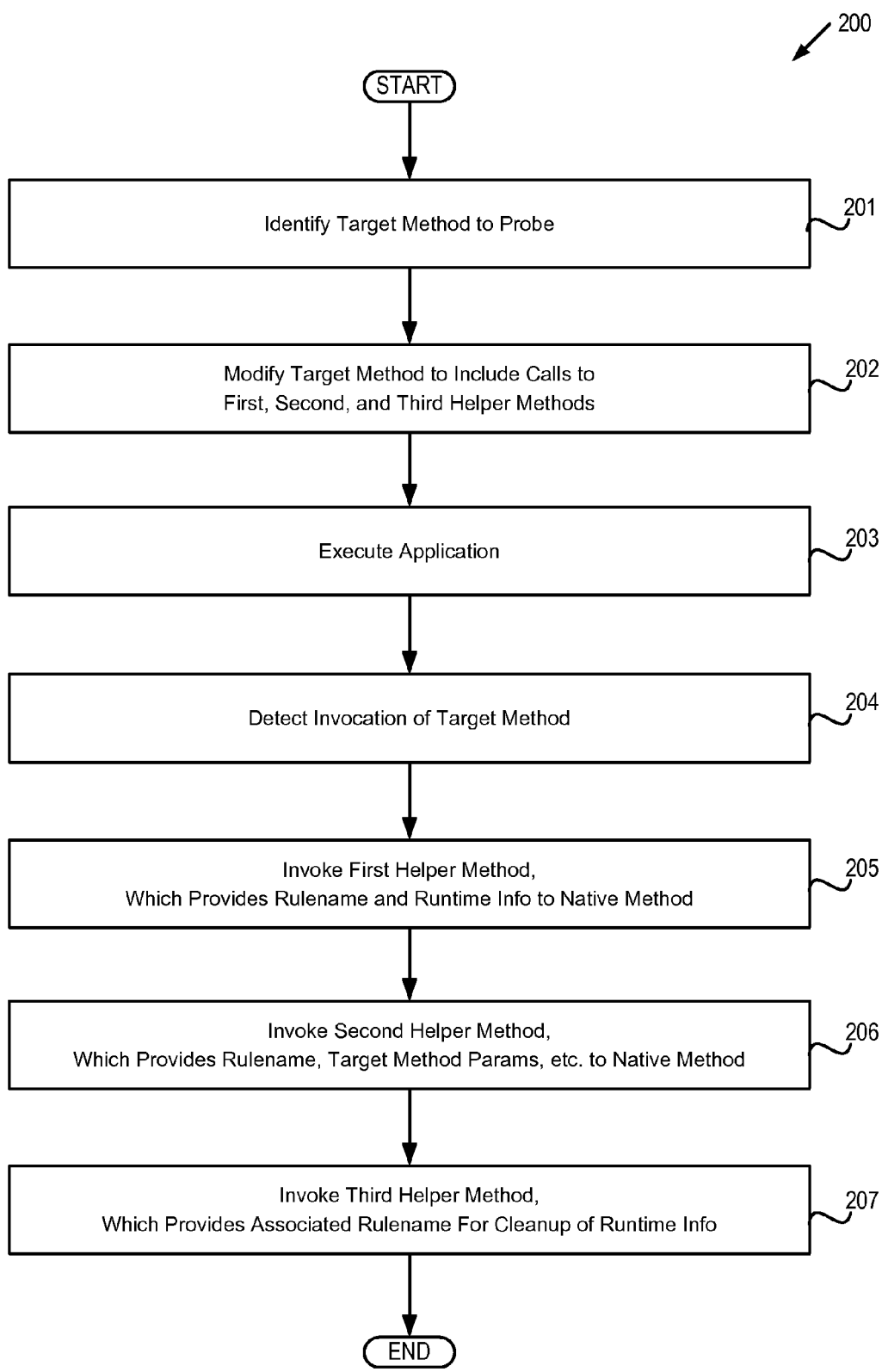
FIG. 2 depicts a flow diagram of one embodiment of a method for runtime probing of a software application.

FIG. 2 depicts a flow diagram of one embodiment of a method 200 for runtime probing of a software application. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some alternative embodiments blocks depicted in FIG. 2 may be performed simultaneously or in a different order than that depicted.

At block 201, a target method to probe in an application is identified. In one example, kernel module 116 identifies a target method to probe in application 104 (e.g., in response to an administrator command, a script, etc.).

At block 202, the target method is modified to include a call to a first helper method 124-1 that passes a rulename and runtime information (e.g., a stack trace, etc.) to a native method of shared object library 126; a call to a second helper method 124-2, after the call to the first helper method 124-1, that passes the rulename and a set of method parameters passed into the target method to the native method; and a call to a third helper method 124-3, after the call to the second helper method 124-2, that passes the rulename and is responsible for removing the runtime information from a data structure of software tool 112 in which the runtime information is inserted (the data structure and its storage of the runtime information is described in detail below).

As described above, the native method includes a marker associated with a trio of probe points inserted in the application at locations relative to the target method, and the rulename identifies the marker associated with the trio of probe points. In one embodiment, the modification of block 202 is performed by injector code 120. In one example, injector code 120 is generated by a Byteman script, which in turn is generated by the execution of monitoring script 114.

At block 203, application 104 is executed, and at block 204 invocation of the target method is detected. In one example, kernel module 116 detects invocation of the target method, and may do so indirectly via detecting that the first helper method 124-1 has been invoked.

At block 205, the first helper method 124-1 is invoked, which results in the native method of the shared object library receiving runtime information pertaining to the execution of the target method (e.g., a stack trace of the target method, etc.). In one embodiment, first helper method 124-1 triggers the java stack trace and passes it (e.g., line by line, including a counter for the depth within the stack trace) along with the rulename to the native method being probed by software tool 112. Once received by software tool 112, the stack trace information is stored in a data structure. In one example, Systemtap is the software tool 112, and the data structure is a Systemtap array, and each line of the stack trace, as it is encountered, is assigned to a respective slot of the Systemtap array. It should be noted that the Systemtap array is thread indexed, thereby preventing any collisions if multiple Systemtap instances exist and attempt to access the array simultaneously, or if multiple Java threads are executing and attempt to access the array simultaneously.

At block 206, the second helper method 124-2 is invoked. In one example, second helper method 124-2 passes the rulename and the set of method parameters passed into the target method to the native method of the shared object library, and the binary 118 matching the specified rulename is then executed.

At block 207, the third helper method 124-3 is invoked. In one embodiment, third helper method 124-3 passes its associated rulename to the native method of the shared object library, and when kernel module 116 encounters a call to the associated marker (e.g., Systemtap encountering an SDT marker call, etc.), kernel module 116 removes the appropriate runtime information entries in its data structure (e.g., elements matching the thread identifier in the Systemtap, etc.).

Figure 3:
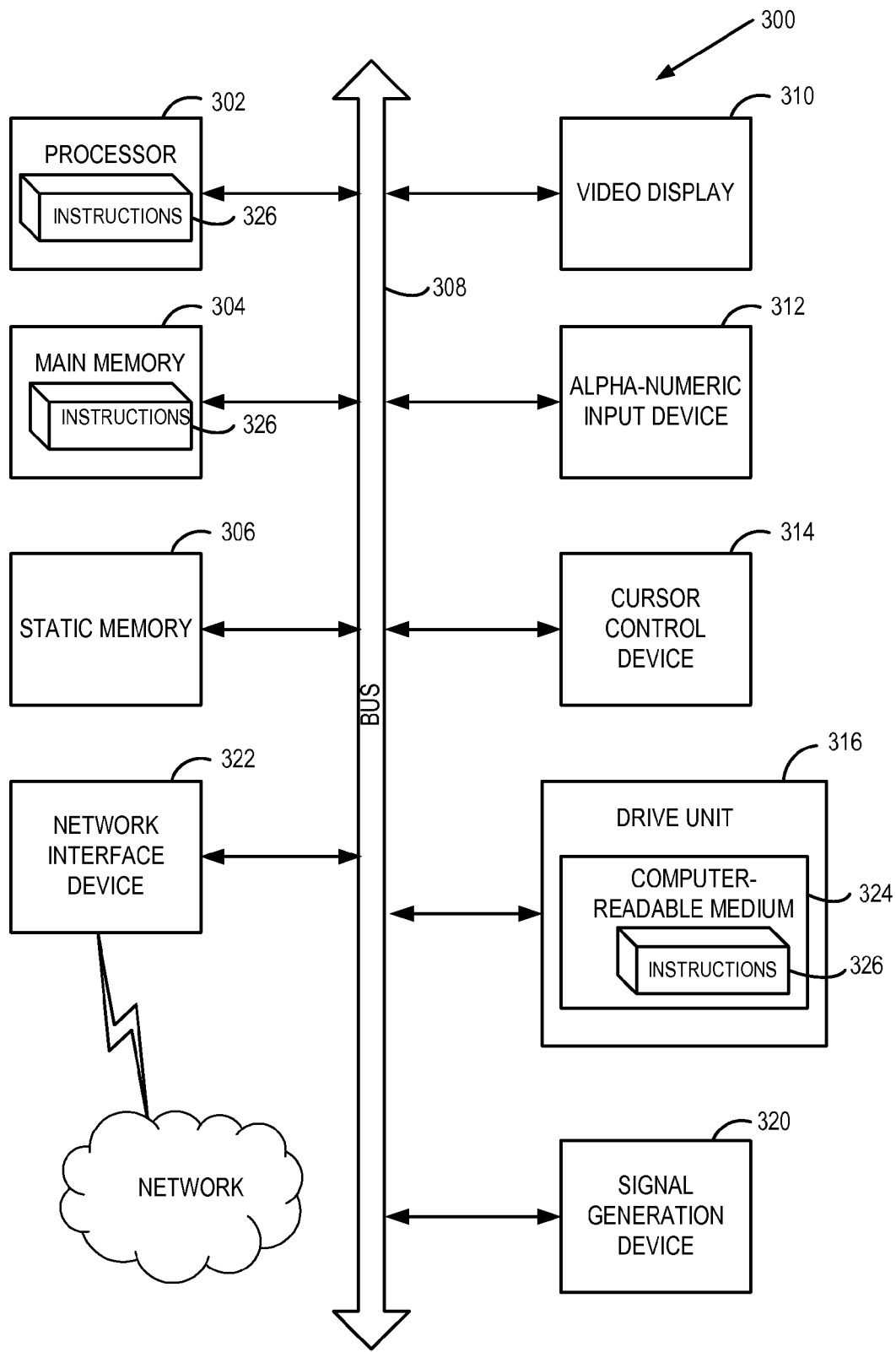
FIG. 3 depicts a block diagram of an illustrative computer system operating in accordance with embodiments of the disclosure.

FIG. 3 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 300 includes a processing system (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 306.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2, etc.) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "modifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   modifying, by a hardware processing device, a first method of a software application in a first programming language to include a call to a second method in the first programming language, wherein the second method comprises a method body that collects runtime information and passes data comprising the runtime information and an identifier that identifies a marker associated with the first method to a third method that:
      is in the first programming language,
      has an implementation in a second programming language, and
      provides the data to a software tool; and
   executing, by the hardware processing device, the modified first method within a virtual machine.

2. The method of claim 1 wherein the runtime information comprises a stack trace of the executing of the modified first method.

3. The method of claim 1 wherein the third method stores at least a portion of the runtime information in a data structure of the software tool.

4. The method of claim 3 further comprising modifying the first method to include a call to a fourth method that removes the at least a portion of the runtime information from the data structure.

5. The method of claim 1 wherein the third method belongs to a shared library associated with the software tool.

6. The method of claim 1 wherein the modifying is performed by a script executed by a code injector, and wherein the script is generated by the software tool.

7. The method of claim 1 wherein the implementation of the third method and the software tool are executed outside the virtual machine.

8. An apparatus comprising:
   a memory to store code of a software application in a first programming language; and
   a hardware processing device, operatively coupled to the memory, to:
      modify a first method of the software application in a first programming language to include a call to a second method in the first programming language wherein the second method comprises a method body that collects runtime information and passes data comprising the runtime information and an identifier that identifies a marker associated with the first method to a third method that:
         is in the first programming language,
         has an implementation in a second programming language, and
         provides the data to a software tool, and
      execute the modified first method within a virtual machine.

9. The apparatus of claim 8 wherein the runtime information comprises a stack trace of the executing of the modified first method.

10. The apparatus of claim 8 wherein the hardware processing device is further to execute the software tool and to process the data comprising the runtime information in the software tool.

11. The apparatus of claim 8 wherein the third method stores at least a portion of the runtime information in a data structure of the software tool.

12. The apparatus of claim 11 wherein the hardware processing device is further to modify the first method to include a call to a fourth method that removes the at least a portion of the runtime information from the data structure.

13. The apparatus of claim 8 wherein the third method belongs to a shared library associated with the software tool.

14. The apparatus of claim 8 wherein the implementation of the third method and the software tool are executed outside the virtual machine.

15. A non-transitory computer readable storage medium, having instructions stored therein, which when executed, cause a hardware processing device to:
   modify, by the hardware processing device, a first method of a software application in a first programming language to include a call to a second method in the first programming language, wherein the second method comprises a method body that collects runtime information and passes data comprising the runtime information and an identifier that identifies a marker associated with the first method to a third method that:

is in the first programming language,
has an implementation in a second programming language, and
provides the data to a software tool; and
execute, by the hardware processing device, the modified first method within a virtual machine.

16. The non-transitory computer readable storage medium of claim 15 wherein the runtime information comprises a stack trace of the executing of the modified first method.

17. The non-transitory computer readable storage medium of claim 15 wherein the third method stores at least a portion of the runtime information in a data structure of the software tool.

18. The non-transitory computer readable storage medium of claim 17 wherein the hardware processing device is further to modify the first method to include a call to a fourth method that removes the at least a portion of the runtime information from the data structure.

19. The non-transitory computer readable storage medium of claim 15 wherein the first method calls a fourth method that comprises a foreign function interface.

* * * * *